May 4, 1954     J. M. HILL     2,677,556
INSURANCE FORM
Filed July 31, 1951     2 Sheets-Sheet 2
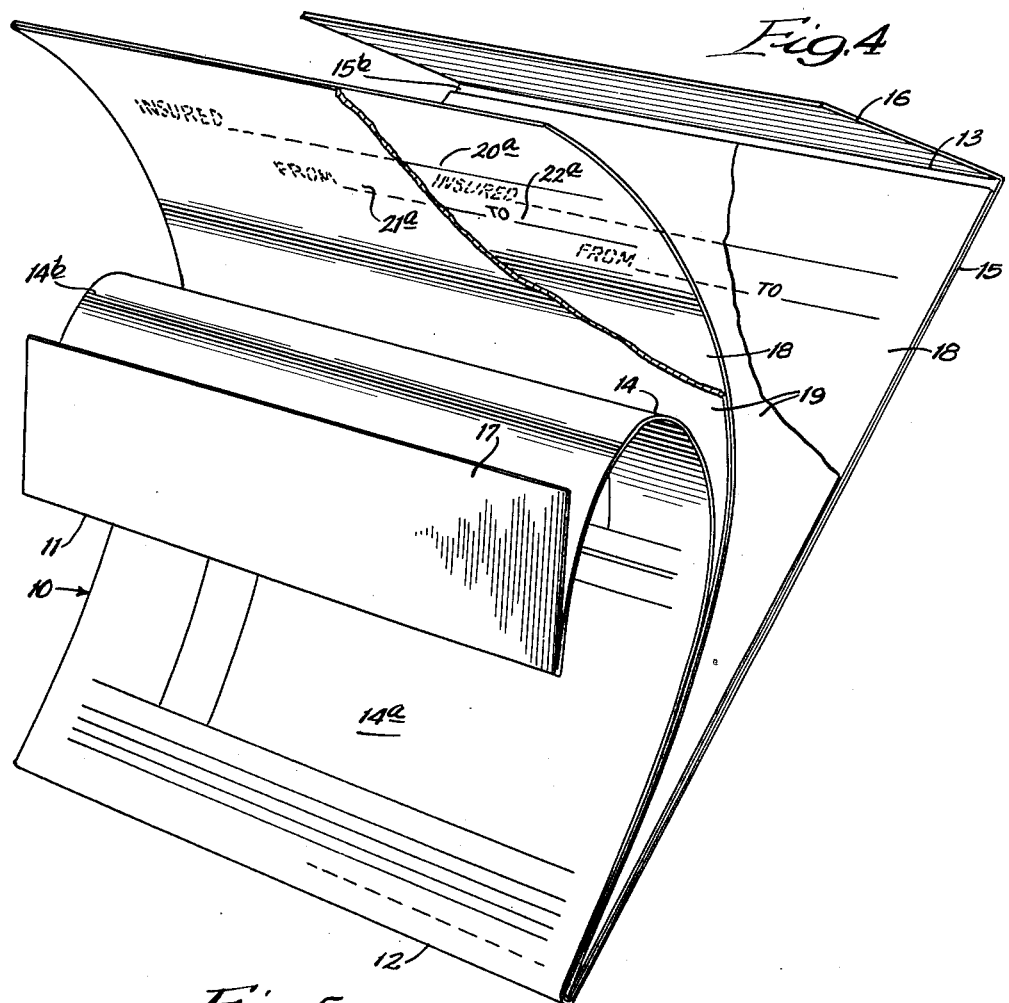
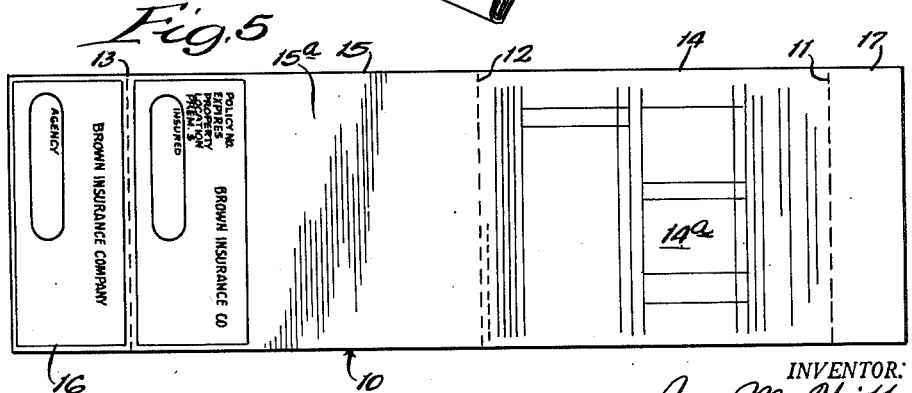
INVENTOR:
Joe M. Hill,
BY Dawson & Ooms,
ATTORNEYS.

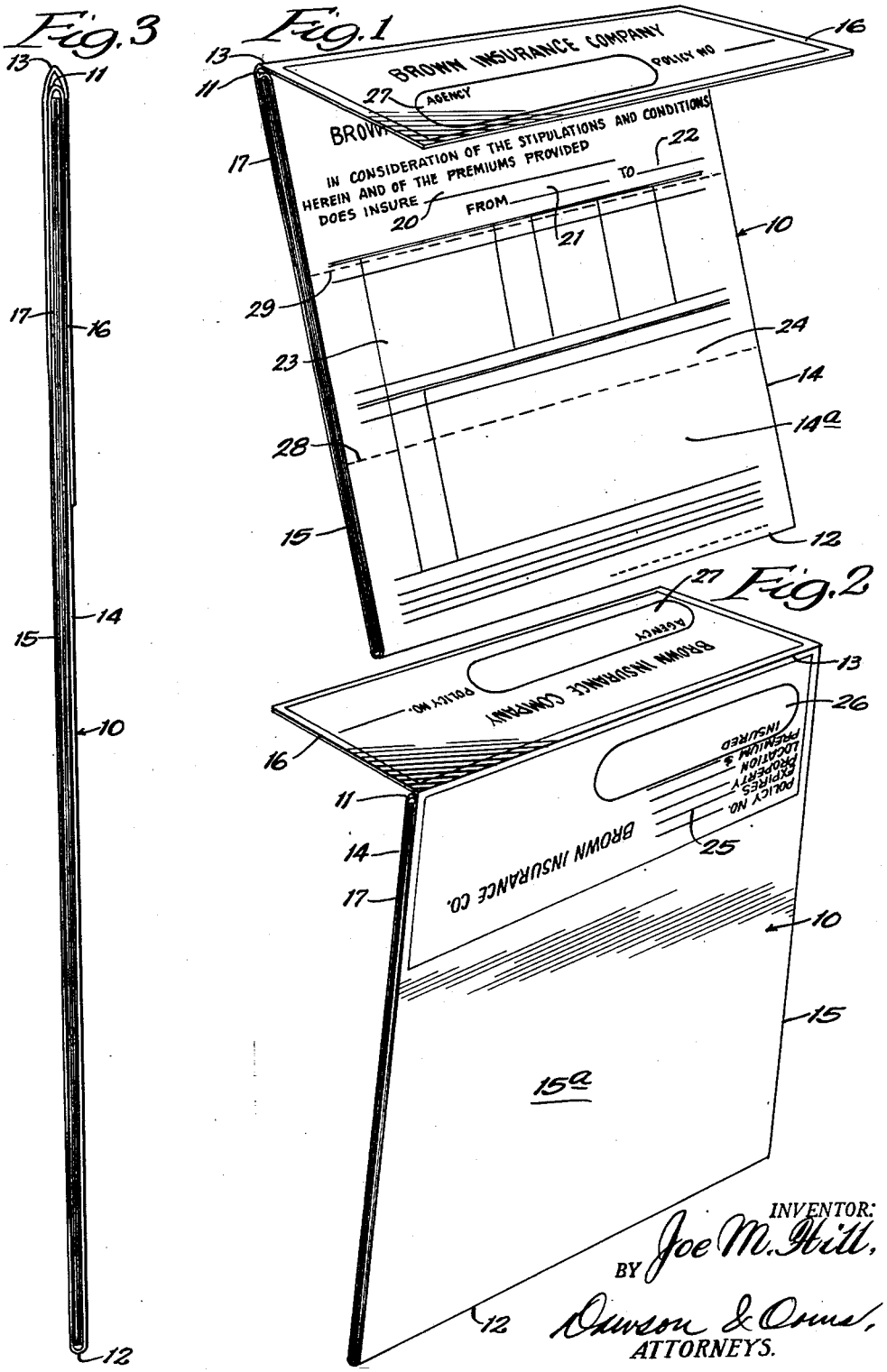

Patented May 4, 1954

2,677,556

UNITED STATES PATENT OFFICE

2,677,556

INSURANCE FORM

Joe M. Hill, Austin, Tex., assignor to The Steck Company, Austin, Tex., a corporation of Texas Application July 31, 1951, Serial No. 239,447

3 Claims. (Cl. 282—27)

My invention relates to forms for insurance policies or the like, and more particularly to the type of insurance forms which include both a policy form and additional record sheets such as the agent's daily report, etc.

The procedure generally followed by most insurance companies in issuing policies is to have the local agent forward the necessary coverage and payment information to the main office of the company for preparing the policy. This information is then typed onto a policy form in the designated spaces thereon. The required clerical work in connection with the issuance of the policy also includes the preparation of certain additional forms such as daily reports, agents' records, expiration sheets, and invoices upon which must be entered the same coverage and payment data included in the policy form. Therefore, it has become the general practice to design the additional forms so that by using carbons the required coverage and payment information can be entered thereon by the same typing operation as the policy. This has resulted in a considerable saving of time, but the sets of forms provided for this purpose have certain practical disadvantages which prevent the simultaneous preparation of both the policy form and the additional forms from being as convenient and efficient as would otherwise be desired.

The policy form has heretofore consisted of an integral sheet folded upon itself to provide a front sheet and back sheet. The printed stipulations and conditions of the policy are contained on the inside pages, while spaces for the entry of coverage and payment data is provided on the outside pages, and mainly on one of the outside pages, although part of the information may be repeated on the other outside page. The additional forms are designed to lie between the folded sheets of the policy form and to have the spaces thereon in registry with the spaces on the main outside page so that the entries can be impressed on all forms simultaneously by the use of carbons, which may be of the one-time or disposable type. These sets of forms are printed, folded, and assembled so that it is only necessary for the person preparing the form to pick up one of the assembled form sets and insert it in the typewriter. However, due to the fact that the outside policy form providing a cover for the additional forms is open at one end there is a tendency for the additional forms to become displaced from correct alignment with the outside form during handling, and particularly during the insertion of the form set in the typewriter. There is a further difficulty in the use of such a form assembly in that the assembly must be removed from the typewriter to permit erasures to be made on the additional forms. Furthermore, the entry space layout of many of these forms is such that it is not possible to make all of the required entries by merely passing the form set once through the typewriter.

After the policy and additional forms have been prepared, the policy and one or more of the forms are generally forwarded by mail to the local agent, who checks them for accuracy, and then mails the policy to the insured party. Thus, this part of the procedure requires that an envelope be addressed to the agent by the main office, and probably in addition that an envelope be addressed to the insured party by the local agent. Heretofore, no method has been suggested for substantially lessening the burden of this additional clerical work.

Therefore, it is an object of my invention to provide an insurance policy form adapted for use with the required additional forms which provides positive means for retaining the additional forms in correct registration with the outside policy form during handling, and particularly while being inserted in and passed through the typewriter. More specifically, it is an object of my invention to provide a policy form having three-folds instead of the usual one-fold so that the form set can be assembled into a complete package wherein the additional forms are retained within a pocket closed at both the top and bottom. It is a further object of my invention to provide a set of forms which effectively retain the additional forms in correct alignment with the policy form during typing, while permitting erasures to be made on the additional forms without removing the forms from the typewriter. It is also an object of my invention to design a form having the spaces thereon for the entry of the agent's name and address and the insured's name and address positioned so that when the policy is folded for mailing that it can be inserted in a window-equipped envelope so that either the address of the agent or the address of the assured will appear in the window as desired. Further objects and advantages will appear as the specification proceeds.

My invention is shown in an illustrative embodiment in the accompanying drawing in which—

Figure 1 is a perspective front view of a complete set of insurance forms embodying my invention; Fig. 2, a perspective back view of the set of forms of Fig. 1; Fig. 3, a side elevational view of the same set of forms; Fig. 4, a perspective view of the same set of forms showing the front sheet of the policy form turned back to disclose the inside flap extending therefrom, the insert sheets, and the carbons; and Fig. 5, a plan view of the insurance policy form prior to being folded to produce the outside form shown in the other figures.

In the illustration given, 10 designates generally an insurance policy form prepared according to my invention. As shown more clearly in Fig. 5, form 10 consists of an elongated sheet of paper, which is preferably a continuous sheet folded upon itself along three equally spaced transverse lines 11, 12, and 13 to provide a front sheet 14 and a back sheet 15 with fold line 12 being at the bottom of the outside face 14a of sheet 14 and at the top of outside face 15a of sheet 15. There is also provided by fold line 13 an outside flap 16 extending from back sheet 15 for approximately one-quarter the length of sheet 15 and adapted to overlie the top of outside face 14a, as shown more clearly in Figs. 1 and 3. Fold line 11 provides a side flap 17 extending from front sheet 14 and lying between front sheet 14 and back sheet 15.

When form 10 is folded as just described, there is provided a pocket between sheet 14 and 15 adapted to retain insert sheets and carbons therein in alignment with outside face 14a. Preferably, the insert sheets 18 and the intervening carbons 19 (Fig. 4) are of substantially the same length so as to lie between these sheets with their upper and lower ends snugly abutting the inside of folds 11 and 12, as shown more clearly in Fig. 3. Thus, the insert sheets and carbons will be locked between folds 11 and 12 and thereby held in continuing direct alignment with outside face 14a.

It will be understood that the policy sheets and insert sheets can be adapted for a wide variety of types of insurance policies. The method of adapting such forms is indicated by the legends and ruled lines shown in the drawings. For example, outside face 14a will have designated spaces thereon for the entry of the coverage and payment data. In the illustration given, the layout is adapted for a casualty policy with the name of the insured being entered in space 20 and the duration of the policy in spaces 21 and 22. The perils insured against and other information pertaining thereto such as premiums can be entered in the ruled spaces designated generally at 23, while the description of the property can be entered in the ruled space designated generally as 24, as seen more clearly in Fig. 1. The inside faces 14b and 15b can be printed to set out the fixed clauses of the policy, no typing being required on these inside faces. The outside face 15a is preferably provided in the lower quarter thereof with legends and ruled spaces designated generally as 25 (Fig. 2) for the additional entry of the same coverage and payment data in summary form entered on face 14a. The reason for providing these spaces on the bottom quarter of face 15a is so that the information will appear on the outside of the policy when it is folded in the manner subsequently to be described. The lower quarter of face 15a is also preferably provided with an address space 26 into which may be typed the name and address of either the agent issuing the policy or the party insured as in the illustration given. Space 26 is preferably positioned so that the name and address typed therein can be made to appear in the window of a mailing envelope when the policy is folded.

Outside flap 16 is also preferably provided with a space 27 for the entry of the address of either the agent or the person insured. For example, in the illustration given, space 27 is intended to have the agent's name and address entered therein. Space 27 is also preferably positioned on flap 16 so that it can be made to appear in the window of the mailing envelope when the policy is folded with flap 16 on the outside thereof.

In order that the required information can be entered in all of the designated spaces on form 10, as well as reproducing this information by means of the carbons on the insert sheets 18, it will be understood that all of the spaces into which information is to be typed are to run parallel to folds 11, 12, and 13 and to be otherwise adapted to be filled in consecutively from the top of face 14a to the bottom of outside flap 16, as the form is passed once through the typewriter. Also, in order to permit erasures to be made on insert sheets 18 without removing the forms from the typewriter, it is preferred that inside flap 17 be relatively short so that substantially all of the spaces into which information is entered can occur almost entirely below the level of flap 17. In the illustration given, inner flap 17 is considerably shorter than outer flap 16 and the spaces for the entry of information begin below the level of flap 17, as indicated more clearly in Fig. 1.

It will also be understood that insert sheets 18, which are to serve as daily reports, etc. are printed so as to have designated spaces thereon to correspond to the spaces for the entry of information on face 14a. For example, in the illustration given, designated spaces 20a, 21a, and 22a are indicated to correspond to the entry spaces at the top of face 14a. The entry spaces on the insert sheets are of course positioned so as to register with the same spaces on face 14a when the insert sheets are properly locked between the folds of form 10.

*Operation*

In the preparing of forms embodying the features of my invention, a policy form can be printed on an integral elongated sheet, as illustrated in Fig. 5. Similarly, the insert sheets can be printed to correspond to the face which is to form the outside or front page of the policy form. Form 10 is then folded along lines 11, 12, and 13, and the additional forms and carbons are inserted in the pocket between front page 14 and back page 15, as well illustrated in the drawings. There is thus formed a complete package within which the insert forms and carbons are securely held.

These assembled form sets can then be piled within reach of the person in the main office of the insurance company having the job of entering the data on the policy, which the local agent has forwarded. During the insertion of the form set in the typewriter, the form will be turned over with face 15a upwardmost and with outside flap 16 at the bottom. In holding the forms for inserting them in the typewriter to prevent any change in alignment between the inserts and the policy form, the thumb of one hand can be inserted between sheets 14 and 15 above inner flap 17 with the forefinger of the same hand below the forms so that the upper ends of the insert forms are clamped between sheet 14 and inner flap 17. Similarly, the thumb and forefinger of the other hand can be used to grasp the outside of the form set at a higher point so as to clamp the top portions of the insert forms between sheets 14 and 15. In this or in a similar manner, the forms can be easily inserted in a typewriter while maintaining perfect registration between the information spaces on face 14a and those on the additional forms. Further, folds 11 and 12 continue to cooperate with each other while the form is being rolled through the typewriter to prevent the inserts from moving longitudinally in either direction with respect to face 14a.

If an error should be made in entering the information, inner flap 17 can be folded back, as suggested in Fig. 4, to disclose the inner forms, permitting erasures to be made on these forms without removing them from the typewriter and against the roll of the typewriter.

As the form is passed through the typewriter and face 14a is completed the inserts and carbons can be removed and then the form can be rolled forward in the typewriter so that the required information can be entered on face 15a and on the outside of flap 16. In the illustration given, there is provided on the bottom quarter of face 15a spaces for the entry of the coverage and payment data as entered on face 14a, and also a space for the entry of the name and address of the person insured in such a position that this address can be made to appear in the window of a mailing envelope. Similarly, outside flap 16 provides a space for the entry of the name and address of the agent.

After all of the information has been typed in policy form 10, it is removed from the typewriter and again folded as indicated in Fig. 1, preferably with the insert forms removed. Form 10 is then refolded toward outside flap 16 along dotted line 28, as indicated in Fig. 1. Preferably, fold line 28 is about midway between the bottom of outside flap 16 and the bottom of outside face 14a, so that fold 12 will be brought into alignment with the lower edge of flap 16b upon the compression of the fold along line 28. Form 10 is then again refolded along line 29 (Fig. 1) to bring the upwardly folded portion beneath front flap 16. Upon the completion of these folding operations, front flap 16 forms one side of the folded form, while the bottom quarter about side face 15a forms the other side. The form can now be inserted in a mailing envelope having a window for return to the local agent, the name and address of the agent being caused to appear in the window. In other words, space 27 is aligned with the window in the mailing envelope. After the local agent has examined the policy, he can then forward it by mail to the party insured by merely reversing its formal position in the window-equipped mailing envelope, so that the name and address of the assured appear in the envelope window. In the illustration given, space 26 will be aligned with the envelope window.

While in the foregoing specification I have set forth specific details of an insurance form embodying my invention, it will be understood that many of these details can be varied widely by those skilled in the art without departing from the spirit of my invention.

I claim:

1. A form for an insurance policy or the like, comprising an elongated sheet folded upon itself along three equally spaced transverse lines to provide front and back sheets of the same length, an outside flap extending from said back sheet for approximately one-quarter the length of said sheets and adapted to overlie the top of the outside face of said front sheet, and an inside flap extending from said front sheet and lying between said front and back sheets beneath said outside flap, said inside flap being shorter than said outside flap, whereby a pocket is provided between said sheets adapted to retain insert sheets therein in alignment with the outside face of said front sheet, the outside face of said front sheet having designated spaces for the entry of coverage and payment data, and the bottom quarter of the outside face of said back sheet and said outside flap having designated spaces for the entry of addresses thereon, all of said spaces running parallel to said folds and being otherwise adapted to be filled in consecutively on the typewriter, and both of said address spaces being positioned so that they can be made to appear in the windows of mailing envelopes when said form is refolded toward said outside flap along a line midway between the bottom of said outside flap and the bottom of the outside face of said front sheet and again refolded to bring the upwardly folded portion beneath said front flap.

2. A form for an insurance policy or the like, comprising an elongated sheet folded upon itself along three equally spaced transverse lines to provide front and back sheets of the same length, an outside flap extending from said back sheet for about one-quarter the length of said sheets and adapted to overlie the top of the outside face of said front sheet, and an inside flap extending from said front sheet for less than one-quarter of the length of said front sheet and lying between said front and back sheets and entirely beneath said outside flap, whereby a pocket is provided between said sheets, at least one insert sheet and one carbon sheet of substantially the same length as said front and back sheets lying within said pocket with its top and bottom edges snugly abutting the top and bottom folds of said pocket so that said sheets are maintained in alignment with the outside face of said front sheet, the outside face of said front sheet having designated spaces for the entry of coverage and payment data, the face of said insert sheet lying beneath the outside face of said front sheet having corresponding spaces for the entry of coverage and payment data thereon by means of said carbon sheet, and the bottom quarter of the outside face of said back sheet and said outside flap having designated spaces for the entry of addresses thereon, all of said spaces running parallel to said folds and being otherwise adapted to be filled in consecutively on the typewriter, and both of said address spaces being positioned so that they can be made to appear in the windows of mailing envelopes when said form is refolded toward said outside flap along a line midway between the bottom of said outside flap and the bottom of the outside flap of said front sheet and again refolded to bring the upwardly folded portion beneath said front flap.

3. The form of claim 2 in which said spaces for the entry of coverage and payment data on the outside face of said front sheet and the corresponding spaces on said insert sheet occur almost entirely below the level of said inside flap, whereby said inside flap can be unfolded during typing to permit erasures to be made on said insert sheet.

References Cited in the file of this patent

UNITED STATES PATENTS

| Number | Name | Date |
| --- | --- | --- |
| 520,816 | Wallace | June 5, 1894 |
| 646,638 | Cutler | Apr. 3, 1900 |
| 981,366 | Boyce | Jan. 10, 1911 |
| 1,129,110 | Montgomery | Feb. 23, 1915 |
| 1,303,838 | Callahan | May 13, 1919 |
| 2,235,259 | Juhl | Mar. 18, 1941 |
| 2,590,259 | Maas | Mar. 25, 1952 |